(12) United States Patent
Katada et al.

(10) Patent No.: US 7,363,255 B2
(45) Date of Patent: Apr. 22, 2008

(54) APPARATUS UNIT REPLACEMENT ASSISTING METHOD AND SYSTEM

(75) Inventors: Kazuhiro Katada, Aichi-gun (JP); Toshihiro Rifu, Nasu-gun (JP); Kiyoshi Nagata, Otawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 10/668,315

(22) Filed: Sep. 24, 2003

(65) Prior Publication Data
US 2004/0230504 A1 Nov. 18, 2004

Related U.S. Application Data

(63) Continuation of application No. PCT/JP02/03458, filed on Apr. 5, 2002.

(30) Foreign Application Priority Data
Apr. 5, 2001 (JP) .............................. 2001-106567

(51) Int. Cl.
*G06Q 30/00* (2006.01)
(52) U.S. Cl. ...................................... 705/26
(58) Field of Classification Search .................. 705/26, 705/27, 2
See application file for complete search history.

(56) References Cited

U.S. PATENT DOCUMENTS 4,037,302 A * 7/1977 Hollander .................. 29/403.3
4,135,241 A * 1/1979 Stanis et al. ................. 705/28
4,509,123 A * 4/1985 Vereen ....................... 700/130
4,899,292 A * 2/1990 Montagna et al. ......... 707/104.1

(Continued)

FOREIGN PATENT DOCUMENTS

CN 1249478 4/2000

(Continued)

OTHER PUBLICATIONS

Dobler, Donald W. and Burt, David N., Purchasing and Supply Management, Text & Cases, 6th Ed., The McGraw-Hill Companies, Inc., 1996.*

(Continued)

*Primary Examiner*—Andrew Joseph Rudy
*Assistant Examiner*—O. Garcia Ade
(74) *Attorney, Agent, or Firm*—Oblon, Spivak, McClelland, Maier & Neustadt, P.C.

(57) ABSTRACT

By providing an apparatus unit replacement assisting method, in which, upon receipt of a request from a first user to replace a first unit comprising part of an apparatus with a second unit, the second unit is offered to the first user at a price after the deduction of the trade-in price of the first unit, and maintenance is performed on the first unit taken from the first user for trade-in, so that the first unit in maintenance status is offered to a second user who wishes replacement with the first unit at a price lower than the price of the first unit when newly purchased, it is possible to reduce the cost incurred when replacing a unit in a CT apparatus or the like on the part of the user, such as a hospital, and facilitate the management of the production line of the apparatus and the dispatch of service persons on the part of the manufacturer while making a contribution to environmental improvement.

27 Claims, 4 Drawing Sheets

U.S. PATENT DOCUMENTS

| | | | |
|---|---|---|---|
| 5,179,583 A * | 1/1993 | Oikawa | 378/135 |
| 5,228,069 A * | 7/1993 | Arenson et al. | 378/19 |
| 5,287,267 A * | 2/1994 | Jayaraman et al. | 705/10 |
| 5,374,813 A * | 12/1994 | Shipp | 235/375 |
| 5,524,758 A * | 6/1996 | Lupul | 206/459.5 |
| 5,533,079 A * | 7/1996 | Colburn et al. | 377/6 |
| 5,608,193 A * | 3/1997 | Almogaibil | 177/25.13 |
| 5,630,070 A * | 5/1997 | Dietrich et al. | 705/8 |
| 5,646,389 A * | 7/1997 | Bravman et al. | 235/385 |
| 5,767,661 A * | 6/1998 | Williams | 320/152 |
| 5,774,873 A | 6/1998 | Berent et al. | |
| RE35,848 E * | 7/1998 | Tanaka | 378/16 |
| 5,790,409 A * | 8/1998 | Fedor et al. | 700/232 |
| 5,794,207 A | 8/1998 | Walker et al. | |
| 5,842,976 A * | 12/1998 | Williamson | 600/300 |
| 5,912,818 A * | 6/1999 | McGrady et al. | 700/232 |
| 5,940,807 A * | 8/1999 | Purcell | 705/26 |
| 6,023,683 A * | 2/2000 | Johnson et al. | 705/26 |
| 6,215,844 B1 | 4/2001 | Adachi et al. | 378/19 |
| 6,234,522 B1 * | 5/2001 | Albrecht et al. | 280/737 |
| 6,249,774 B1 * | 6/2001 | Roden et al. | 705/28 |
| 6,324,522 B2 * | 11/2001 | Peterson et al. | 705/28 |
| 6,341,271 B1 * | 1/2002 | Salvo et al. | 705/28 |
| 6,349,830 B1 * | 2/2002 | Lebron | 206/461 |
| 6,385,593 B2 * | 5/2002 | Linberg | 705/28 |
| 6,389,337 B1 * | 5/2002 | Kolls | 701/29 |
| 6,418,416 B1 * | 7/2002 | Rosenberg et al. | 705/28 |
| 6,516,301 B1 * | 2/2003 | Aykin | 705/10 |
| 6,594,535 B1 * | 7/2003 | Costanza | 700/97 |
| 6,947,516 B2 * | 9/2005 | Okumura et al. | 378/19 |
| 6,967,563 B2 * | 11/2005 | Bormaster | 340/10.31 |
| 7,123,680 B2 * | 10/2006 | Katada et al. | 378/16 |
| 2002/0054659 A1 * | 5/2002 | Okumura et al. | 378/19 |
| 2002/0082959 A1 * | 6/2002 | Barnard et al. | 705/29 |
| 2002/0176530 A1 * | 11/2002 | Okumura et al. | 378/19 |
| 2004/0071258 A1 * | 4/2004 | Okumura et al. | 378/19 |
| 2006/0241402 A1 * | 10/2006 | Ichihara et al. | 600/425 |

FOREIGN PATENT DOCUMENTS

| | | |
|---|---|---|
| JP | 9-62152 | 3/1997 |
| JP | 9-130704 | 5/1997 |
| JP | 2000-48066 | 2/2000 |
| JP | 2000-123036 | 4/2000 |
| JP | 2000-222458 | 8/2000 |
| JP | 2000-306021 | 11/2000 |
| JP | 2001-196198 | 7/2001 |
| JP | 2001-256342 | 9/2001 |

OTHER PUBLICATIONS

Bragg, Steven M., Accounting Best Practices, John Wiley and Sons, Inc., 1999.*

Danish, Sherif & Gannon, Patrick, Building Database-Driven Web Catalogs, McGraw-Hill Companies, Inc., 1998.*

Taylor, Bernard W., III, Introduction to Management Science, 5th Ed., Prentice-Hall Inc., NJ, 1996.*

De Bijl, Paul W.J., Aftermarkets: The Monopoly Case, CentER for Economic Research, Tilburg University, Tilburg, The Netherlands, Oct. 1995.*

Chopra, Sunil, and Meindl, Peter; Supply Chain Management, Strategy, Plannin, & Operation, Prentice-Hall, Inc., Oct. 10, 2000.*

White, Ron, How Computers Work, 6th Ed., Que Corporation, Sep. 10, 2001.*

Gralla, Preston, How the Internet Works, 6th Ed., Que Corporation, Sep. 7, 2001.*

Derfler, Frank J. et. al. How Networks Work, Millennium Ed., Que Corporation, Aug. 23, 2000.*

White, James J., and Summers, Robert S., Uniform Commercial Code, 4th Ed., West Publishing Co., St. Paul, MN, 1995.*

Riley, David D., Data Abstraction and Stucture, An Introduction to Computer Science II; Boyd and Fraser Publishing Company, 1987.*

Muller, Nathan J., Desktop Encyclopedia of the Internet, Artech House, Inc., 1998.*

Greene, James H, Editor-in-Chief, Production and Inventory Control Handbook, 3rd Ed., McGraw-Hill Companies, Inc., 1997.*

* cited by examiner

FIG. 2

| NAME OF HOSPITAL | TYPE OF INSTALLED APPARATUS | TYPE OF EMPLOYED DETECTOR | DESIRED DETECTOR TO BE PURCHASED | TYPE OF TRADE-IN DETECTOR | DELIVERY DATE |
|---|---|---|---|---|---|
| HOSPITAL A | PRODUCT A | 8-SLICE | 16-SLICE | 8-SLICE FOR PRODUCT A | 2001.4.1 |
| | PRODUCT A | 8-SLICE | | | |
| HOSPITAL B | PRODUCT A | 4-SLICE | 8-SLICE | 4-SLICE FOR PRODUCT A | 2001.5.1 |
| | PRODUCT A | 4-SLICE | | | |
| HOSPITAL C | PRODUCT A | SINGLE | 4-SLICE | SINGLE | 2001.7.1 |
| HOSPITAL D | PRODUCT B | SINGLE | 4-SLICE | SINGLE | 2001.6.1 |

FIG. 4

| TYPE OF APPARATUS (COMMON IN PRODUCTS A AND B) | SALES PRICE OF NEW UNIT (MIL. YEN) | SALES PRICE OF OLD UNIT (MIL. YEN) | TRADE-IN PRICE (MIL. YEN) |
|---|---|---|---|
| 16-SLICE | 1,600 | 1,200 | 800 |
| 8-SLICE | 800 | 600 | 400 |
| 4-SLICE | 400 | 300 | 200 |
| SINGLE | 100 | 75 | 50 |

FIG. 3

| TYPE OF APPARATUS (PRODUCT A) | INVENTORY | PRODUCTION | PRODUCTION DUE DATE | MAINTE-NANCE | MAINTENANCE DUE DATE | INSTALLMENT HOSPITAL | INSTALLMENT SCHEDULED DATE | MAN-POWER |
|---|---|---|---|---|---|---|---|---|
| 16-SLICE | × | ○ | 2001.3.31 | ○ |  | HOSPITAL A | 2001.4.1 | 2 |
| 8-SLICE | × |  |  |  | 2001.4.30 | HOSPITAL B | 2001.5.1 | 2 |
| 4-SLICE | × |  |  | ○ | 2001.6.30 | HOSPITAL C | 2001.7.1 | 1 |
| SINGLE | × |  |  | ○ |  |  |  |  |
| TYPE OF APPARATUS (PRODUCT B) | INVENTORY | PRODUCTION | PRODUCTION DUE DATE | MAINTE-NANCE | MAINTENANCE DUE DATE | INSTALLMENT HOSPITAL | INSTALLMENT SCHEDULED DATE | MAN-POWER |
| 16-SLICE | × |  |  |  |  |  |  |  |
| 8-SLICE | × |  |  |  |  |  |  |  |
| 4-SLICE | × | ○ | 2001.5.31 |  |  | HOSPITAL D | 2001.6.1 | 1 |
| SINGLE | × |  |  |  |  |  |  |  |

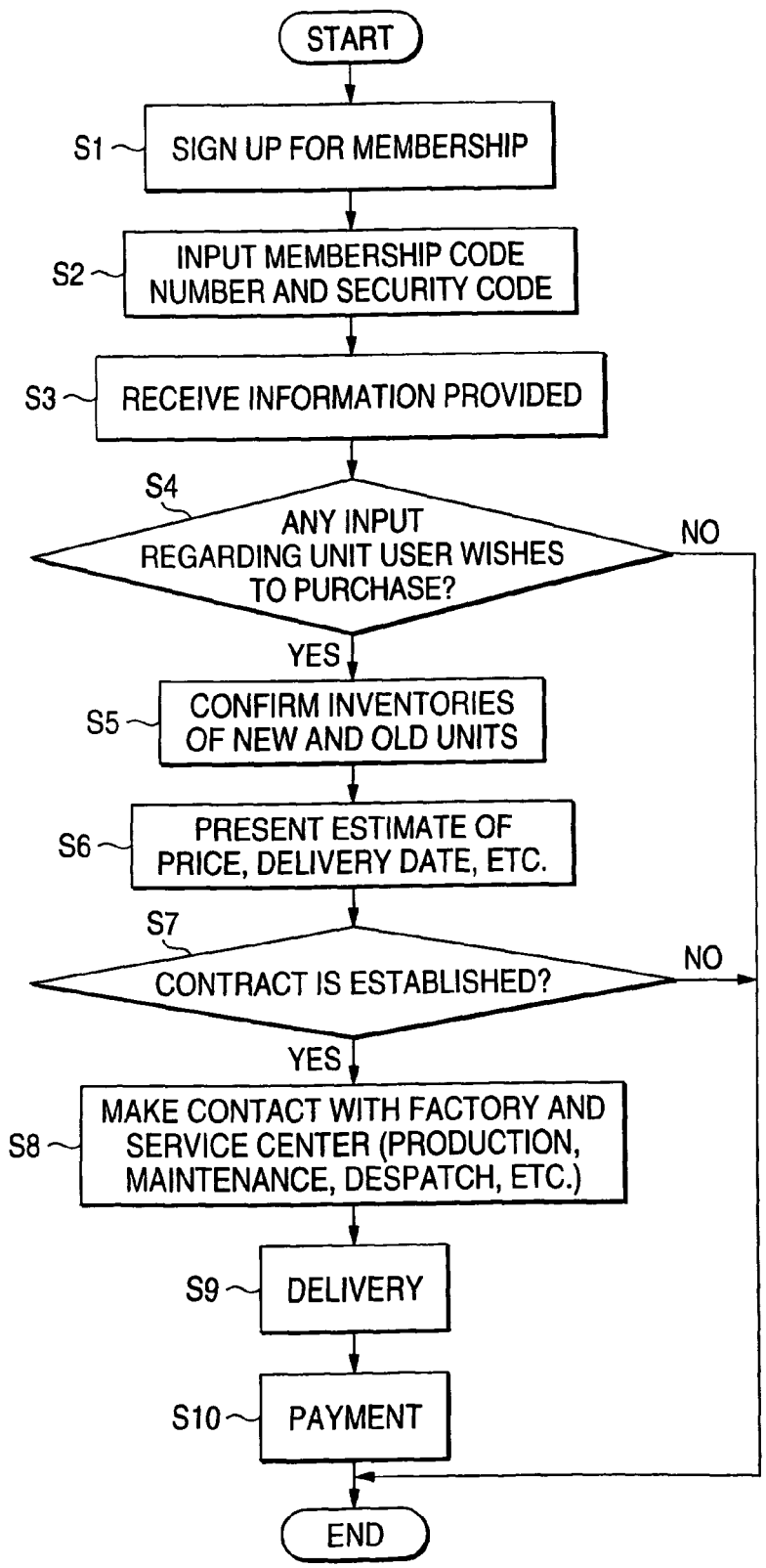

APPARATUS UNIT REPLACEMENT ASSISTING METHOD AND SYSTEM

CROSS-REFERENCE TO RELATED APPLICATIONS

This is a Continuation Application of PCT Application No. PCT/JP02/03458, filed Apr. 5, 2002, which was not published under PCT Article 21(2) in English.

This application is based upon and claims the benefit of priority from the prior Japanese Patent Application No. 2001-106567, filed Apr. 5, 2001, the entire contents of which are incorporated herein by reference.

BACKGROUND OF THE INVENTION

1. Field of the Invention

The present invention relates to apparatus unit replacement assisting method and system for assisting unit replacement in an X-ray CT apparatus or the like.

2. Description of the Related Art

Recently, an X-ray computed tomography apparatus (hereinafter, referred to as the X-ray CT apparatus) has been playing an important role in many occasions in medical practice including diagnosis and treatment of a disease, scheduling of an operation, etc. The X-ray CT apparatus provides tomographic images of a patient based on strength of X-rays having passed through the patient. The tomographic images can be obtained, for example, through rotation scanning around the patient followed by predetermined processing.

A known detector employed in the X-ray CT apparatus is generally a detector referred to as "a single slice detector" or "a multi slice detector (or two dimensional array detector)" depending on an array arrangement of detecting elements. The former single slice detector is comprised of a plurality of detecting elements arranged in a row. The latter multi slice detector comprises more than one single slice detector, that is, arrays of a plurality of detecting elements in plural rows.

Presently, 4-slice type is used extensively as the multi slice detector mounted on the X-ray CT apparatus. According to this X-ray CT apparatus, four images can be obtained at a time as an X-ray tube and the 4-slice multi slice detector rotate around a patient once. That is to say, by using the 4-slice multi slice detector, it is possible to acquire images, such as tomographic images, at a speed four times as fast as the single slice detector.

Hence, there is an increasing clinical need for an X-ray CT apparatus equipped with a multi slice detector because of the capability of enabling an efficient diagnosis and reducing a total exposure of a patient to radiation, etc. It is thus well anticipated that a system that excels the 4-slice multi slice CT apparatus in a faster scanning rate, for example, an 8-slice CT apparatus or a 16-slice CT apparatus, will come into widespread use.

Incidentally, when a hospital purchases a CT apparatus (for example, a 16-slice CT apparatus) that is most recently developed by a manufacturer, a conventionally installed single slice CT apparatus or 4-slice CT apparatus is returned to the manufacturer due to a limited space or the like. Under present circumstances, however, the manufacturer has to scrap the old apparatus previously installed in the hospital.

Recently, manufacturers are conducting a study of the possibility of upgrading a detector alone. However, the detector accounts for a large percentage of the cost of the CT apparatus. Thus, the cost is little saved on the part of the hospital by upgrading the detector alone (to be exact, the detector and peripheral equipment). For example, one CT system costs tens of millions of yen, and the detector accounts for approximately 60% of the total cost.

Also, because a unit like a detector deteriorates over time, a warranty period or a lifetime is specified, and the detector may be replaced by a detector of the same grade when the specified term expires. In the case of a general hospital, when a new CT apparatus is purchased, the existing CT apparatus may be used in another medical examination. In such a case, the detector may be replaced by a detector of a lower grade that complies with the imaging conditions.

Meanwhile, on the part of manufacturers, it is difficult to control the assembly line of a CT apparatus because they are unable to predict the receipt of an order that is placed at random from the hospital. When the products are manufactured more than necessary, the products have to be wasted, and conversely, when the produces are manufactured less than necessary, the delivery of the system is delayed, which causes trouble to the hospital. Moreover, parts needed to assemble a CT apparatus have to be purchased in excess of necessary quantities in advance.

In addition, a CT apparatus is not something that the user can undertake installment or replacement of the detector. Hence, a service person has to be dispatched to the hospital for approximately one week on each request for purchase or for replacement of the detector, which makes it difficult for the manufacturers to manage the dispatch of service persons.

Moreover, each time a new apparatus is purchased, the CT apparatus or the detector is scrapped on the manufacturer's end, which is not environmentally good.

Incidentally, used CT apparatuses are being on sale recently. However, they are sold by the product, and not by the unit, such as the detector. Also, in the case of the secondhand sales, unconditional tube replacement service, maintenance and painting service, software upgrade service, and trade-in service are being offered.

In regard to such service, related arts are disclosed in JP-A-2001-196198, according to which an on-site replaceable unit, such as the X-ray tube, is configured to store data indicating the characteristics thereof, so that, by reading out the stored data, environment settings are made automatically when the on-site replaceable unit is attached to a medical diagnostic unit, which enables the upgrading of software programs through a network transmission.

Also, JP-A-2001-256342 describes service-information providing scheme related to a sales promotion and maintenance service system, according to which a purchaser of a personal computer or the like, or a purchaser of the personal computer as secondhand is provided with service information over a network, and the service information includes version upgrade information, discount information for those who made an access, etc. in addition to the product manual.

BRIEF SUMMARY OF THE INVENTION

The invention was devised in view of the foregoing, and therefore has an object to provide apparatus unit replacement assisting method and system that assist unit replacement in an X-ray CT apparatus or the like, by saving the cost incurred when replacing a unit in the CT apparatus or the like on the part of the user, such as a hospital, and by facilitating the management of the product line of the apparatus and the dispatch of service persons on the part of the manufacturer while making a contribution to environmental improvement.

An apparatus unit replacement assisting method according to a first invention includes: a step of receiving request information expressing a wish to replace a first unit comprising part of a first apparatus owned by the first user with a second unit; a step of receiving, from a second user different from the first user, release information informing release of a second unit comprising part of a second apparatus owned by the second user and usable in the first apparatus; and a step of presenting inquiry information to the first user, asking whether the first user is going to use the second unit released from the second user as a replacement unit for the first apparatus.

An apparatus unit replacing method according to a second invention includes: a step of notifying, from a user to a unit provider and manager, a replacement request of a unit comprising part of an apparatus; a step of notifying, from the user to the unit provider and manager, a specific target replacement unit; and a step of notifying, from the user to the unit provider and manager, whether the user wishes a new unit or a secondhand unit for the target replacement unit.

An apparatus unit replacement assisting system according to a third invention includes: a plurality of user apparatuses owned by a plurality of apparatus users; and one or more management apparatuses owned by an apparatus manager. The management apparatus includes: communication means for enabling communications with the plurality of user apparatuses; request information managing means for managing request information received from a first user apparatus among the plurality of user apparatuses through the communication means, the request information expressing a wish to replace a first unit comprising part of a first apparatus owned by an apparatus user of the first user apparatus with a second unit; release information managing means for managing release information received from a second user apparatus, different from the first user apparatus, among the plurality of user apparatuses through the communication means, the release information informing release of a second unit comprising part of a second apparatus owned by an apparatus user of the second user apparatus and usable in the first apparatus; and inquiry information notifying means for notifying, through the communication means, the first user apparatus of inquiry information, asking whether the second unit in the second apparatus is going to be used as a replacement unit for the first apparatus. Each user apparatus includes: communication means enabling communications with any one of the one or more management apparatuses; information notifying means for notifying the management apparatus of the unit replacement request information and the unit release information through the communication means; and information presenting means for presenting the inquiry information received from the management apparatus through the communication means.

A management apparatus for an apparatus unit replacement assisting system according to a fourth invention is used in an apparatus unit replacement assisting system including a plurality of user apparatuses owned by a plurality of apparatus users and one or more management apparatus owned by an apparatus manager. The management apparatus includes: communication means for enabling communications with the plurality of user apparatuses; request information managing means for managing request information received from a first user apparatus among the plurality of user apparatuses through the communication means, the request information expressing a wish to replace a first unit comprising part of a first apparatus owned by an apparatus user of the first user apparatus with a second unit; release information managing means for managing release information received from a second user apparatus, different from the first user apparatus, among the plurality of user apparatuses through the communication means, the release information informing release of a second unit comprising part of a second apparatus owned by an apparatus user of the second user apparatus and usable in the first apparatus; and inquiry information notifying means for notifying, through the communication means, the first user apparatus of inquiry information, asking whether the second unit in the second apparatus is going to be used as a replacement unit for the first apparatus.

A user apparatus for an apparatus unit replacement assisting system according to a fifth invention is used in an apparatus unit replacement assisting system including a plurality of user apparatuses owned by a plurality of apparatus users and one or more management apparatus owned by an apparatus manager. The user apparatus includes: communication means enabling communications with any one of the one or more management apparatus; information notifying means for notifying the management apparatus of the unit replacement request information and unit release information through the communication means; and information presenting means for presenting inquiry information received from the management apparatus through the communication means.

An apparatus unit replacement assisting system according to a sixth invention includes: managing means for managing information of a unit comprising part of an apparatus for each of apparatuses installed at a plurality of sites; and confirming means for confirming, in response to information related to a request to replace the unit in an apparatus installed at any one of the plurality of sites, whether a secondhand unit is acceptable as a target replacement unit for the unit.

An apparatus unit replacement assisting system according to a seventh invention includes: obtaining means for obtaining information of a unit comprising part of an apparatus for each of apparatuses installed at a plurality of sites; and managing means for managing, in response to information related to a request to replace the unit in an apparatus installed at any one of the plurality of sites, at least one of a production line in a production factory of the apparatus, a maintenance line of the unit, dispatch of a service person who performs a replacement work of the unit.

An apparatus unit replacement assisting system according to an eighth invention includes: obtaining means for obtaining information of a unit comprising part of an apparatus for each of apparatuses installed at a plurality of sites; and presenting means for presenting, in response to information related to a request to replace a first unit with a second unit in an apparatus installed at any one of the plurality of sites, a sales price of the second unit after deduction of a trade-in price of the first unit to a request sender site.

BRIEF DESCRIPTION OF THE SEVERAL VIEWS OF THE DRAWING

FIG. 2 is a view showing one example of management information by user stored in a database held at the manufacturer's end in the embodiment;

FIG. 3 is a view showing one example of schedule management information by apparatus type and product stored in the database held at the manufacturer's end in the embodiment;

FIG. 4 is a view showing one example of price information by apparatus type and product stored in the database held at the manufacturer's end in the embodiment; and FIG. 5 is a flowchart detailing a flow of the procedure in which since a user has expressed his wish to replace a unit until the replacement is completed in the embodiment.

DETAILED DESCRIPTION OF THE INVENTION

Figure 1:
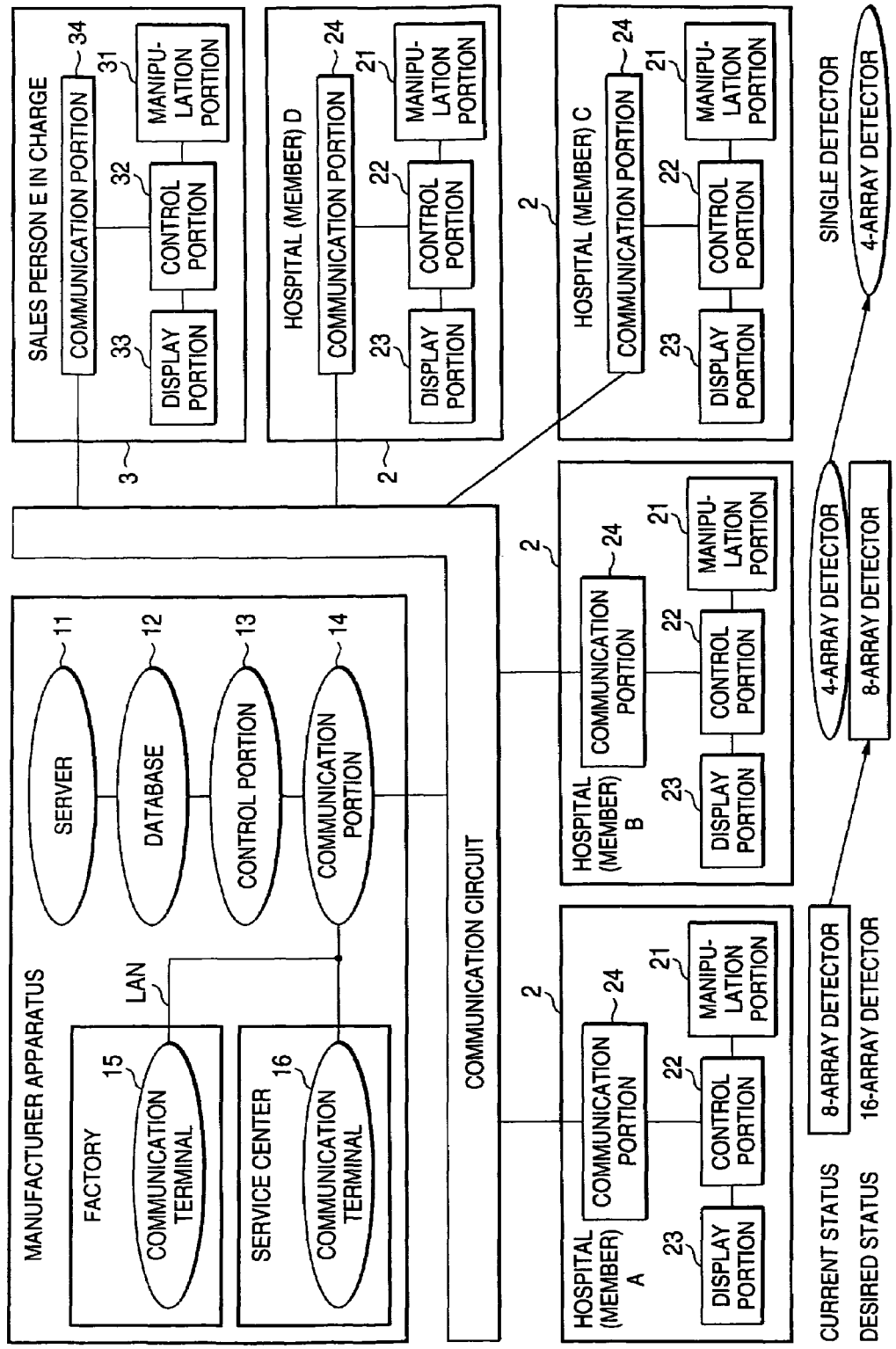
FIG. 1 is a block diagram schematically showing an arrangement of an apparatus unit replacement assisting system according to one embodiment of the invention.

The following description will describe in detail one embodiment of apparatus unit replacement assisting service and system of the invention with reference to the drawings. Hereinafter, an explanation will be given to upgrade assisting system and service for a detector in an X-ray CT apparatus by way of example. It should be noted that, in practice, not only the detector but also peripheral equipment (for example, a DAS standing for a data acquisition system) or the like are upgraded; however, an explanation of the latter is omitted for ease of explanation.

FIG. 1 is a block diagram schematically showing an arrangement of upgrade assisting service and system for a detector in an X-ray CT apparatus according to one embodiment of the invention. FIG. 2, FIG. 3, and FIG. 4 are views used to explain a database (contents and management information) held at the manufacturer's end. FIG. 5 is a flowchart when the user upgrades the unit. Hereinafter, an explanation will be given briefly to the upgrade assisting system for the detector in the X-ray CT apparatus according to one embodiment of the invention, with reference to FIG. 1 through FIG. 5.

As shown in FIG. 1, the upgrade assisting service and system according to one embodiment of the invention comprises a manufacturer apparatus 1 (apparatus at the manufacturer's end), and a number of user apparatuses 2 (apparatuses at the users' end) and a salesperson apparatus 3 (apparatus at the end of a salesperson in charge) each connected to the manufacturer apparatus 1 via a communication line, such as the Internet. The communication line may be a private line.

The manufacturer apparatus 1 comprises a management server 11, a database 12, a control portion 13, a communication portion 14, a personal computer (hereinafter, referred to as the communication terminal) 15 having the communications capability and installed inside the factory, and a personal computer (hereinafter, referred to as the communication terminal) 16 having the communications capability and installed inside the service center. Each user apparatus 2 is a personal computer (hereinafter, referred to as the communication terminal) having the communications capability, and as shown in the drawing by way of example, each comprised of a manipulation portion 21 including a keyboard, a mouse, etc., a control portion 22, a display portion 23, and a communication portion 24. The personal computer (hereinafter, referred to as the communication terminal) 3 owned by the salesperson in charge is comprised of a manipulation portion 31, a control portion 32, a display portion 33, and a communication portion 34, all having substantially the same capabilities as those of their respective counterparts in the user apparatus 2.

In the manufacturer apparatus 1, the communication terminals 15 and 16 in the factory, the service center or the like are connected to each other on a LAN via a private line. The manufacturer apparatus 1 is connected to each user apparatus 2 and to the salesperson apparatus 1 via a communication line using a public network.

The upgrade assisting system shown in the drawing is to effectively use a detector (a particular unit comprising part of the X-ray CT apparatus) that is no longer used by a physician (user) in the hospital who has signed up for membership, through a trade-in, maintenance, sales, and installment service undertaken at the manufacturer's end.

According to this system, guide information related to the upgrading of detectors is transmitted from the manufacturer to the users registered as members. This enables the users to make a decision on the purchase of a detector by comparing the prices of old detectors and new detectors, the delivery date, etc. based on the transmitted information. In this system, it should be noted that when various kinds of services, including the information related to the upgrading of detectors thus transmitted, are provided to the users, the services are provided only under the management of the management server 11 in the manufacturer apparatus 1.

Information excluded from the guide information, such as more detailed information, can be provided from the management server 11 to the user wishing to obtain the detailed information under specific conditions through judgment processing by the personal computer 16 installed at the service center in the manufacturer apparatus 1. Also, the users can see part of the contents in the database 12 only when the management server 11 allows access.

The above information providing method will be described in detail below.

Contents of information and the management information (information registered in the database 12) held at the manufacturer's end will now be explained with reference to FIG. 2, FIG. 3, and FIG. 4.

The contents of information held at the manufacturer's end include: the guide information of detectors transmitted to the users; the contract status of each detector; information as to the apparatus installed in the hospital of each user; information as to the type of detector employed in the apparatus; the type of detector on order from the user; the date of order; a period of installment; inventories of detectors or the like stored in the factory; a production period of detectors or the like to be produced by the current production line; a dispatch schedule of respective service persons; the price of a detector when the detector is newly purchased; the price of a detector that the manufacture purchased from another hospital and performed the maintenance; a time needed for maintenance on a detector purchased from a hospital; the least number of CT examinations by a user that makes the upgrading of the detector profitable, etc. Further, the management server 11 in the manufacturer apparatus 1 constantly inputs new information into the database 12, such as registration of a detector on request for trade-in, a feature project by the manager, contract information of respective detectors, etc.

The management server 11 is furnished with a function of reading out information from the database 12 through a search, or retrieving information from the manufacturer apparatus 1, upon receipt of a request, a search condition, etc. from the authorized user 2. The user obtains an access permit by inputting identification information, such as his membership code number and security code, through the manipulation portion 21 on the user apparatus 2, and then by accessing the management server 11 through the communication portion 24 and the communication portion 14. For this reason, the management server 11 stores information needed to access the manufacturer apparatus 1 provided on the communication line, such as the Internet.

Of all the users, only those who signed up for the membership are provided with upgrade information or the like periodically, for example, once a month, from the manufacturer apparatus 1. Alternatively, because the manufacturer apparatus 1 has registered each hospital and the apparatus currently installed at each hospital (including information of a unit, such as the detector) in the database 12, it may be arranged in such a manner that the manufacturer apparatus 1 provides the user apparatus 2 with the upgrade information when the user merely inputs the identification information.

Operations when the user is going to purchase a detector in the manner described above will now be explained briefly with reference to FIG. 5.

The user registers the type of a detector he wishes to purchase, the delivery date, etc. in the database. Alternatively, the salesperson in charge may perform database registration at request from the user, or the person in charge in the service center may perform database registration on the personal computer 16 installed at the center. Herein, an explanation will be given in detail to a case where the users (Hospitals A, B, C, and D) perform database registration by way of example.

The user wishing to upgrade the detector first obtains his membership code number and security code by communicating with the manufacturer apparatus or making contact with the service center or the salesperson in charge, on the user apparatus 2. Then, when the user decides to upgrade the detector from the upgrade-related information received from the manufacturer apparatus 1, the user performs the following on the user apparatus 2.

The user activates the user apparatus 2 and requests access to the manufacturer apparatus 1 through the manipulation portion 25, then the control portion 22 in the user apparatus 2 first reads out information needed to access the management server 11 in the manufacturer apparatus 1, connects the communication portion 23 to the communication portion 14 in the manufacturer apparatus 1 via the communication line, and outputs an access request to the manufacturer apparatus 1.

Upon receipt of the access request through the communication portion 14, the control portion 13 in the manufacturer apparatus 1 sends the information indicating the input of the membership code number and the security code managed by the management server 11 to the user apparatus 2 through the communication portion 14. The control portion 22 in the user apparatus 2 then displays the information thus received through the communication portion 24 on the display portion 23.

In a case where the user inputs the membership code number and the security code by manipulating the manipulation portion 25, such as a keyboard and a mouse, the control portion 22 notifies the manufacturer apparatus 1 of the input information through the communication portion 24. Upon receipt of the membership code number and the security code through the communication portion 14, the control portion 13 checks the received information against the information managed in the management server 11, and notifies the user apparatus 2 of an access permit to the database 12, through the communication portion 14 only when a match is confirmed.

By taking the procedure as above, the user is able to see part of the information related to the detectors registered in the database 12 sequentially. Also, by inputting a specific search condition that meets his need, for example, the type, price, delivery date, model year of an available detector, the type of a detector compatible with the CT apparatus, or a combination of the foregoing, the user conducts search by means of the control portion 13 in the manufacturer apparatus 1, and is thereby able to see the information that satisfies the condition.

When the user wishes to see information not registered in the database 12 as well, he can see additional information by retrieving such information (for example, product information and catalog information) from the management server 11 in the manufacturer apparatus 1 to be displayed on the display portion 23, by pressing a command button being displayed. Likewise, the user can retrieve information about a feature project. In this case too, the user apparatus 2 selects information at a command from the user, and displays only the information satisfying the condition that meets the user's need.

When the user cannot find a detector satisfying the condition that meets his need, the user can register the condition of a detector he wishes to purchase in the manufacturer apparatus 1. In this case, when a detector that satisfies the condition is registered later, it is preferable that the management server 11 in the manufacturer apparatus 1 transmits the information related to this particular detector only to the user who registered the condition.

When the user finds a detector satisfying the condition that meets his need from the search information and product information and decides to purchase the detector, he can commence the purchase procedure by inputting a message indicating the intention of purchase through the manipulation portion 21, for example, by manipulating a contract application button being displayed.

The management server 11 in the manufacturer apparatus 1 then reads out contract information of the respective detectors, and sends the same to the user apparatus 1 through the communication portion 14. Upon receipt of the information, the control portion 22 in the user apparatus 2 extracts the information on sold detectors as non-display information from the entire information thus read out from the database 12 based on the received information, and thereby makes it possible to display only the other information in the database 12 on the display portion 23.

Also, registration in the database 12 is updated at the manufacturer's end each time a CT apparatus is installed at the site of any user or the detector is upgraded.

When the user informs of his intention to purchase a detector in this manner, the database 12 in the manufacturer apparatus 1 is managed as shown in FIG. 2, FIG. 3, and FIG. 4.

FIG. 2 shows management information by user stored in the database 12. Herein, items including the type of currently installed apparatus, the type of detector employed in the installed apparatus, the type of detector that becomes unnecessary when a new detector is purchased, and the delivery date desired are shown for each of the users, Hospitals A, B, C, and D, by way of example. FIG. 3 shows schedule management information by apparatus type and product stored in the database 12. Herein, items including an inventory, the need of production, production due date, availability of maintenance, maintenance due date, installation hospital, installation scheduled date, manpower are shown by way of example. FIG. 4 shows price information by apparatus type and product stored in the database 12. Herein, items including the sales price of a new unit, the sales price of an old (secondhand) unit, the trade-in price are shown by way of example.

As shown in FIG. 2, Hospital A owns two products A-series/the type of installed apparatus, each being equipped with an 8-slice detector/the detector employed in the installed apparatus, and wishes to replace the 8-slice detector in one of the products A with a 16-slice detector by Apr. 1, 2001. Hospital B has installed two products A (each employing a 4-array system detector), and wishes to upgrade one of the detectors to an 8-slice detector by May 1, 2001. Hospital C has installed a product A employing a single detector, and wishes to upgrade the single detector to a 4-slice detector by Jul. 1, 2001. Hospital D has installed a product B employing a single detector, and wishes to upgrade the single detector to a 4-slice detector by Jun. 1, 2001.

As can be understood from FIG. 2, the 4-slice detector in Hospital B can be upgraded by utilizing the 8-slice detector that will become unnecessary in Hospital A. Also, the single detector in Hospital C can be upgraded by utilizing the 4-slice detector that will become unnecessary in Hospital B.

By exploiting these facts, the control portion 13 in the manufacturer apparatus 1 transmits the following instructions to the personal computer 15 in the factory based on the inventory status of the detectors (all out of stock, herein): to produce a 16-slice detector for Hospital A by the end of March, 2001; to produce a 4-slice detector for Hospital B by the end of May, 2001; to finish maintenance on the 8-slice detector that will become unnecessary in Hospital A and on the 4-slice detector that will become unnecessary in Hospital B by the end of April and June, respectively. Meanwhile, the control portion 13 transmits information as to the number of service persons needed and the schedule of dispatch to the personal computer 16 in the service center (see FIG. 3).

On the other hand, the salesperson in charge in the service center presents the price of the 16-slice detector after the deduction of the trade-in price of the 8-slice detector to Hospital A, and presents the price of the 8-slice detector after the deduction of the trade-in price of the 4-slice detector to Hospital B as well. On the other hand, the salesperson offers the hospital C the 4-slice detector, purchased from Hospital B and done with maintenance in the factory, at a price lower than the price of a new 4-slice detector (see FIG. 4).

FIG. 5 shows the flow of the procedure in which since the user has expressed his wish to upgrade a unit until the upgrading is completed.

The user first signs up for membership to receive the upgrade assistance, and obtains the membership code number and the security code (Step S1). When the user wishes to upgrade the detector, he inputs the membership code number and the security code on the user apparatus 2 (Step S2), and receives information related to target upgrade products provided from the manufacturer apparatus 1 (Step S3).

Herein, the manufacturer apparatus 1 judges whether there is an input from the user apparatus 2 as to a unit the user wishes to purchase (Step S4). Upon judging the absence of the input, the manufacturer apparatus 1 ends the processing, and upon judging the presence of the input, the manufacturer apparatus 1 confirms the inventories of both the new and old units (Step S5), and makes an estimate of the prices, delivery date, etc. and notifies the user apparatus 2 of the estimate (Step S6). The user then decides whether he makes a contract according to the contents thus notified (Step S7), and the manufacturer apparatus 1 ends the processing when the user decides not to make a contract. When the user decides to make a contract, the manufacturer apparatus 1 informs the factory and the service center of the contents of the contract, and makes an arrangement as to the production, the maintenance, the dispatch of service persons, etc. (Step S8). When all the foregoing is completed, the contract product is delivered (Step S9), and the user makes the payment (Step S10), whereupon the sequences of processing are completed.

As has been described, an upgrade detector can be purchased at a lower price by trading in the detector employed in the existing apparatus for the new detector with the manufacturer; moreover, the secondhand detector done with maintenance at the manufacturer's end to function as good as a new unit can be purchased at a lower price than the price of a new unit. Hence, the cost can be saved on the part of the hospital.

Also, on the part of the manufacturer, because they can know the number of detectors or the like that need to be produced, not only they can fully exploit the information thus obtained for the production management, but also they can manage the dispatch of service persons more easily.

Further, it is environmentally good because the manufacturer can recycle the detectors that are conventionally scrapped.

Because the manufacturer apparatus 1 has registered the types of apparatus currently installed in the hospital and the unit information as to the type of employed detector in connection with the hospital name in the database 12, the user can readily obtain the upgrade information by merely inputting the identification information on the user apparatus.

Because the upgrade information provided from the manufacturer apparatus 1 includes the index indicating the least number of CT examinations that makes the upgrading profitable, the use may judge whether the upgrading of the product is preferred or not by referring to the index.

While the embodiment of the invention have been described, the invention of the application is not limited to the embodiment above, and can be modified in various manners without departing from the gist of the invention when put into operation. Also, embodiments can be combined where applicable, and combined advantages can be achieved in such a case. Further, inventions in various stages are included in the embodiment above, and various inventions can be extracted by adequately combining a plurality of constituent features disclosed above.

For example, of all the constituent features disclosed in the embodiment above, some of constituent features may be omitted, and the configuration omitting some of the constituent features can be extracted as an invention when the problems described in the column, "the problems the invention is to solve", can be solved, and at least one of the advantages described in the column, "the advantage of the invention", can be achieved.

For example, an explanation was given to the upgrading of the product unit in the embodiment above; however, the invention is not limited to the upgrading. For example, the user may wish to replace the product with a product of the same grade due to expiration of the warranty period or lifetime. Also, the user may wish to replace the product with a product of a lower grade because the existing CT apparatus is used in another examination room. The invention can be suitably adapted to meet such a need.

Also, an explanation was given to the detector in the CT apparatus as the unit to be replaced in the embodiment above. However, it is not sufficient to replace the detector alone in practice, examples of which will now be explained.

(1) The detector in the CT apparatus includes various types having detecting elements in 4 arrays, 8 arrays, 16 arrays, 32 arrays, and so forth. Upgrading is therefore possible by increasing the number of arrays. In this case, however, the chief object is to increase the largest number of slices by increasing the number of arrays. Hence, according to the upgrading by increasing the number of arrays, it is general to increase the largest number of slices by increasing the number of channels in the DAS at the same time and changing the user interface and the software program used for reconstruction.

To be more specific, when a detector having 32 arrays of detecting elements at intervals of 1.0 mm is replaced by a detector having 100 arrays at intervals of 1.0 mm, the use status can be upgraded from 1.0 mm×4 slices, 2.0 mm×4 slices, . . . , and 8.0 mm×4 slices to 1.0 mm×10 slices, 2.0 mm×10 slices, . . . , and 10.0 mm×10 slices. As has been described, in the case of such upgrading, the number of channels in the DAS, the user interface, the software programs used for reconstruction, etc. need to be changed or replaced.

(2) The detector in the CT apparatus includes the one having arrays of detecting elements aligned at regular intervals, and the one having arrays of detecting elements aligned at irregular intervals. For example, even in the case of the detector having 32 arrays of detecting elements, there are a detector having arrays at regular intervals of 1.0 mm and a detector having arrays at intervals of 0.5 mm at the center and at intervals of 1.0 mm at either side. The selection of the alignment is determined depending on the imaging conditions based on the contents of diagnosis. Thus, when the diagnostic purpose to use the CT apparatus is changed, it may be desirable to change the detector from the regular interval alignment type to the irregular interval alignment type or from the irregular interval alignment type to the regular interval alignment type. In this case, because the slice conditions are changed correspondingly, switching circuits, which determine a way in which outputs from the respective arrays are synthesized, need to be changed or replaced.

(3) The detector in the CT apparatus may have the same number of arrays of detecting elements at different intervals. Because selecting the detector having smaller intervals can increase the largest number of slices, the user may wish to replace the unit with the one having different intervals. For example, the interval varies from 1.0 mm to 0.5 mm for 32 arrays of detecting elements, and when the user wishes to replace the unit having arrays of detecting elements at intervals of 1.0 mm to the unit having arrays of detecting elements at intervals of 0.5 mm, it is preferable to increase the largest number of slices by changing the number of channels in the DAS from 4 to 8 or 16. When the number of the DAS channels is increased, the switching circuit connecting the detector to each DAS, the user interface, the software programs used for reconstruction, etc. need to be changed or replaced.

Besides the foregoing, modifications as follows are possible.

For example, an explanation was given to the replacement of the detector in the X-ray CT apparatus in the embodiment above. However, the invention can be applied to other parts, such as the X-ray tube, the diagnostic table apparatus. Also, applications of the invention are not limited to an X-ray CT apparatus, and the invention can be applied to other medical equipment, such as an MRI apparatus (magnetic field coil), or to other products (for example, an elevator) that cannot be installed by the user.

Also, an explanation was given on the assumption that the manufacturer apparatus 1 is provided to only one site in the embodiment above; however, the manufacturer apparatus 1 may be provided to more than one site while being liked up with one another. For example, by distributing the sites to domestic local regions or to places overseas, and by transporting the apparatus unit and dispatching a service person from the production factory or the maintenance factory in the actual region, it is possible to save expenses, such as a transportation fee and tax charges, which reduces the economical burden on both the user and the manufacturer. In addition, the manufacturer becomes able to calculate the trade-in price by taking the expenses, such as a transportation fee and tax charges, into account, and therefore is able to judge a value of a trade-in.

Also, in the embodiment above, when the apparatus unit is for trade-in, the hospital has to provide information as to in what manner and to what extent the unit has been used, so that the manufacturer can judge whether the apparatus unit is usable for replacement and value the apparatus unit for trade-in. On the other hand, the CT apparatus generally accumulates system operation information (log data) within the apparatus to enable judgment on the use status. Thus, when the hospital expresses a wish for a trade-in of the unit, the hospital is request to present the manufacturer the log data read out from the CT apparatus, through an on-line or off-line transmission. This eliminates the need to create the report on the use status of the unit on the part of the hospital, and enables precise judgment on the use status of the unit on the part of the manufacturer, so that the manufacturer can judge the value of the trade-in unit exactly and thereby present an adequate price to the hospital.

Further, the invention is not limited to the detector in the CT apparatus, and can be applied to replacement of a unit comprising part of various apparatuses. An apparatus unit replacement assisting method and a system configuration in such a case will now be explained.

Apparatus Unit Replacement Assisting Method

An apparatus unit replacement assisting method according to the invention includes: a step of receiving, from a first user, request information expressing a wish to replace a first unit comprising part of a first apparatus owned by the first user with a second unit; a step of receiving, from a second user different from the first user, release information informing release of a second unit comprising part of a second apparatus owned by the second user and usable in the first apparatus; and a step of presenting inquiry information to the first user, asking whether the first user is going to use the second unit released from the second user as a replacement unit for the first apparatus.

Herein, the first unit and the second unit are units having substantially the same capability that need to be replaced by a worker. Also, the step of presenting the inquiry information is a step of offering the second unit taken from the second user and done with maintenance, and further, presenting the first user a replacement cost lower than the price of the second unit when newly purchased.

It is preferable that the method described above selectively includes steps if necessary as follows:

a step of making a provisional contract with the first user when information expressing a wish to use the second unit is received from the first user in response to the inquiry;

a step of confirming with the first user whether the second unit as a desired replacement unit is a new unit or a secondhand unit or whether a secondhand unit is acceptable;

a step of confirming with the second user about information related to post-treatment of the second unit;

a step of performing maintenance on the second unit released from the second user;

a step of presenting information about a maintenance fee of the second unit to the second user;

a step of presenting expenses needed for replacement with the second unit to the first user;

a step of presenting a dispatch date of a service person who performs unit replacement to the first user;

a step of confirming a reply from the first user, and a step of managing at least one of a production line in a factory, a unit maintenance line, and dispatch of a service person, depending on the reply from the first user.

Also, in a case where the second user wishes to replace the second unit with a third unit, it is preferable to further include a step of calculating and presenting a trade-in price of the second unit to the second user.

In this case, the step of presenting the trade-in price is a step of presenting the second user a price of the third unit after deduction of the trade-in price of the second unit.

Also, a trial calculation of the trade-in price is made by adding expenses needed for replacement including a transportation fee to a trade-in base price, a value of a trade-in is judged from the trial calculation, and the trade-in price is presented to the second user when the trade-in is judged as profitable.

Also, in a case where the apparatus is configured to automatically record operation history information during use, it is preferable to further include a step of having the second user wishing to trade in the second unit present the operation history information through an on-line or off-line transmission, and judging a value of a trade-in with understanding of a use status of the unit for trade-in from the operation history information, so that the trade-in price is determined based on a result of the value judgment in the step of presenting the trade-in price.

Apparatus Unit Replacement Assisting System

An apparatus unit replacement assisting system according to the invention includes a plurality of user apparatuses owned by a plurality of apparatus users, and one or more than one management apparatus owned by an apparatus manager.

In this case, the management apparatus includes: communication means for enabling communications with the plurality of user apparatuses; request information managing means for managing request information received from a first user apparatus among the plurality of user apparatuses through the communication means, the request information expressing a wish to replace a first unit comprising part of a first apparatus owned by an apparatus user of the first user apparatus with a second unit; release information managing means for managing release information received from a second user apparatus, different from the first user apparatus, among the plurality of user apparatuses through the communication means, the release information informing release of a second unit comprising part of a second apparatus owned by an apparatus user of the second user apparatus and usable in the first apparatus; and inquiry information notifying means for notifying, through the communication means, the first user apparatus of inquiry information, asking whether the second unit in the second apparatus is going to be used as a replacement unit for the first apparatus.

On the other hand, each user apparatus includes: communication means enabling communications with any one of the one or more management apparatuses; information notifying means for notifying the management apparatus of the unit replacement request information and the unit release information through the communication means; and information presenting means for presenting the inquiry information received from the management apparatus through the communication means.

Another example of the system is configured to include: managing means for managing information of a unit comprising part of an apparatus for each of apparatuses installed at a plurality of sites; and confirming means for confirming, in response to information related to a request to replace the unit in an apparatus installed at any one of the plurality of sites, whether a secondhand unit is acceptable as a target replacement unit for the unit.

Alternatively, the system may be configured to include: obtaining means for obtaining information of a unit comprising part of an apparatus for each of apparatuses installed at a plurality of sites; and managing means for managing, in response to information related to a request to replace the unit in an apparatus installed at any one of the plurality of sites, at least one of a production line in a production factory of the apparatus, a maintenance line of the unit, dispatch of a service person who performs a replacement work of the unit.

Further, the system may be configured to include: obtaining means for obtaining information of a unit comprising part of an apparatus for each of apparatuses installed at a plurality of sites; and presenting means for presenting, in response to information related to a request to replace a first unit with a second unit in an apparatus installed at any one of the plurality of sites, a sales price of the second unit after deduction of a trade-in price of the first unit to a request sender site.

When arranged in the above manner, the presenting means makes a trial calculation of the trade-in price by adding expenses needed for replacement including a transportation fee to a trade-in base price, judges a value of a trade-in from the trial calculation, and presents the trade-in price when the trade-in is judged as profitable.

Alternatively, the obtaining means obtains operation history information during use that is automatically recorded by the apparatus; and the presenting means judges a value of a trade-in with understanding of a use status of the unit for trade-in from the operation history information, and determines the trade-in price based on a result of the value judgment.

As has been described in detail, according to the invention, it is possible to provide apparatus unit replacement assisting method and system that can reduce the cost incurred when replacing a unit in a CT apparatus or the like on the part of the user, such as a hospital, and facilitate the management of the production line of the apparatus and the dispatch of service persons on the part of the manufacturer while making a contribution to environmental improvement.

What is claimed is:

1. An apparatus unit replacement assisting method, comprising:

receiving, from a first user apparatus, request information expressing a wish to replace a first detector in a first X-ray CT apparatus with a second detector;

receiving, from a second user apparatus different from said first user apparatus, release information informing release of the second detector in a second X-ray CT apparatus usable in said first X-ray CT apparatus;

presenting inquiry information to said first user apparatus communicating via a computer whether a first user is going to use a refurbished second detector as the second detector for said first X-ray CT apparatus, wherein said refurbished second detector is the second detector.

2. The apparatus unit replacement assisting method according to claim 1, further comprising:

making a provisional contract with said first user apparatus when information expressing a wish to use said second detector is received from said first user apparatus in response to the inquiry.

3. The apparatus unit replacement assisting method according to claim 1, wherein:
said first detector and said second detector have substantially a same capability.

4. The apparatus unit replacement assisting method according to claim 1, wherein:
presenting the inquiry information includes offering maintenance for said second detector.

5. The apparatus unit replacement assisting method according to claim 1, further comprising:
calculating and receiving a trade-in price of said second detector in said second user apparatus where said second detector may be replaced with a third detector.

6. The apparatus unit replacement assisting method according to claim 5, wherein:
receiving the trade-in price includes receiving in said second user apparatus a price of said third detector after deduction of the trade-in price of said second detector.

7. The apparatus unit replacement assisting method according to claim 5, wherein:
receiving the trade-in price includes, making a trial calculation of the trade-in price by adding expenses needed for replacement including a transportation fee to a trade-in base price, judging a value of a trade-in from the trial calculation, and receiving the trade-in price in the second user apparatus when the trade-in is determined to be profitable.

8. The apparatus unit replacement assisting method according to claim 5, further comprising:
receiving operation history information through an on-line or off-line transmission in a case where said apparatus is configured to automatically record the operation history information during use, and determining a value of a trade-in with understanding of a use status of said second detector for trade-in from the operation history information,
wherein receiving the trade-in price includes determining the trade-in price based on a result of the value determination.

9. The apparatus unit replacement assisting method according to claim 1, wherein:
presenting the inquiry information includes presenting said first user apparatus a replacement cost lower than a price of said second detector when newly purchased.

10. The apparatus unit replacement assisting method according to claim 1, further comprising:
receiving from said first user apparatus whether said second detector as a desired replacement unit is a new unit or a secondhand unit or whether a secondhand unit is acceptable.

11. The apparatus unit replacement assisting method according to claim 1, further comprising:
receiving from said second user apparatus information related to post-treatment of said second detector.

12. The apparatus unit replacement assisting method according to claim 1, further comprising:
receiving information about a maintenance fee of said second detector by said second user apparatus.

13. The apparatus unit replacement assisting method according to claim 1, further comprising:
receiving expenses needed for replacement with said second detector by said first user apparatus.

14. The apparatus unit replacement assisting method according to claim 1, further comprising:
receiving a dispatch date of a service person who performs detector replacement by said first user apparatus.

15. The apparatus unit replacement assisting method according to claim 1, further comprising:
confirming a reply from said first user apparatus; and
managing at least one of a production line in a factory, a detector maintenance line, and dispatch of a service person, depending on the reply from said first user apparatus.

16. The apparatus unit replacement assisting method according to claim 1, further comprising:
receiving, from a third user apparatus different from said first and second user apparatus, request information expressing a wish to use said first detector in a third apparatus.

17. An apparatus unit replacing assisting method, according to claim 1, wherein the first detector and the second detector are multi slice detectors, and the second detector is configured to collect a greater number of slices than the first detector.

18. An apparatus unit replacing assisting method, according to claim 1, wherein the first detector is a single slice detector, and the second detector is a multi slice detector.

19. An apparatus unit replacing assisting method, according to claim 1, wherein the first detector and the second detector include data acquisition systems relating to the multi slice detector.

20. An apparatus unit replacing assisting method, according to claim 1, wherein the first detector and the second detector include data acquisition systems relating to the single slice detector and the multi slice detector.

21. An apparatus unit replacing assisting method, according to claim 1, wherein the first detector and the second detector include software for reconfiguration.

22. An apparatus unit replacing assisting method, according to claim 1, wherein the first detector and the second detector include software for reconfiguration.

23. An apparatus unit replacement assisting method, comprising:
receiving, from a first user apparatus, request information expressing a wish to replace a first magnetic field coil in a first MRI apparatus with a second magnetic field coil;
receiving, from a second user apparatus different from said first user apparatus, release information informing release of a second magnetic field coil in a second MRI apparatus usable in said first MRI apparatus;
presenting inquiry information to said first user apparatus communicating via a computer whether a first user is going to use a refurbished second magnetic field coil as the second magnetic field coil for said first MRI apparatus,
wherein said refurbished second magnetic field coil is the second magnetic field coil.

24. The apparatus unit replacement assisting method according to claim 23, further comprising:
making a provisional contract with said first user apparatus when information expressing a wish to use said second magnetic field coil is received from said first user apparatus in response to the inquiry.

25. The apparatus unit replacement assisting method according to claim 23, wherein:
presenting the inquiry information includes offering maintenance for said second magnetic field coil.

26. The apparatus unit replacement assisting method according to claim 23, further comprising:
    calculating and receiving a trade-in price of said second magnetic field coil in said second user apparatus where said second magnetic field coil may be replaced with a third magnetic field coil.

27. The apparatus unit replacement assisting method according to claim 26, wherein:
    receiving the trade-in price includes receiving in said second user apparatus a price of said third magnetic field coil after deduction of the trade-in price of said second magnetic field coil.

* * * * *